United States Patent [19]

Sekida et al.

[11] Patent Number: 4,483,601
[45] Date of Patent: Nov. 20, 1984

[54] CAMERA WITH PHOTOGRAPHIC DATA SETTING DEVICE

[75] Inventors: Minoru Sekida, Sakai; Toshio Yamaki; Akira Fujii, both of Osaka; Shuzo Matsushita, Ikeda; Akira Kataoka, Sennan, all of Japan

[73] Assignee: Minolta Camera Kabushiki Kaisha, Osaka, Japan

[21] Appl. No.: 463,116

[22] Filed: Feb. 2, 1983

[30] Foreign Application Priority Data

Feb. 5, 1982 [JP] Japan .................................. 57-17869
Feb. 26, 1982 [JP] Japan .................................. 57-30936

[51] Int. Cl.³ ...................... G03B 17/02; G03B 17/18
[52] U.S. Cl. .................................. 354/288; 354/289.1
[58] Field of Search ..................... 354/60 R, 106, 288, 354/289, 289.1, 289.11, 289.12, 484, 475, 441–445

[56] References Cited

U.S. PATENT DOCUMENTS 4,118,716 10/1978 Suzuki et al. ......................... 354/442
4,286,849 9/1981 Uchidoi et al. ............. 354/289.12 X Primary Examiner—William B. Perkey
Attorney, Agent, or Firm—Watson, Cole, Grindle & Watson

[57] ABSTRACT

A camera in which a plurality of photographic data are input by manual key operations is made easily operable with less possibility of erroneous data input by inadvertent key operations. The data to be input are classified into first and second groups in accordance with the relevancy of the respective data or the frequency of changing of the respective data during photographing operations. In one embodiment, first and second photographic data setting sections are separately provided at different positions and input keys included in the first data setting section are used for the input of the first group data whereas input keys included in the second data setting section are used for the input of the second group data. In another embodiment, input keys common to the first and second group data setting are included in a single photographic data setting section. The data input by the input keys are those of the first group with a setting data-indicating plate being at a closed position but changed-over to those of the second group with the setting data-indicating plate being moved to an opened position. A flat-type indication device for indication of the input data is provided on a flat oblique surface of the camera descending from the front to the rear of the camera to facilitate its observation.

32 Claims, 19 Drawing Figures

CAMERA WITH PHOTOGRAPHIC DATA SETTING DEVICE

BACKGROUND OF THE INVENTION

1. Field of the Invention

The present invention relates to a device for setting various photographic data, and more particularly it relates to a camera with such a device with which the data is set by key operation.

2. Description of Prior Arts

Cameras have been known heretofore which are provided with a photographic data-setting device with a key input system. In such cameras, wherein input keys are externally exposed at a particular location, it has been likely to occur that the keys are inadvertently operated and data is incorrectly set due to operation of wrong keys. To avoid such erroneous setting, a setting device for a camera disclosed in, for example, U.S. Pat. No. 4,286,849, is arranged to enable setting of photographic data when both an input-setting key and a safety button are simultaneously operated. However, the disclosed setting device requires simultaneous operation of the two operating members and is unfavourable with respect to convenience of its operation.

Additionally, the camera disclosed in the above-mentioned U.S. patent is provided with an indicating device for the indication of photographic data which is located on a flat surface of the camera upper cover that is generally normal to the plane of the film loaded in the camera. When the user observes the indication of the indicating device, he or she will obliquely view the flat surface of the camera upper cover and accordingly the indication of the flat-type indicating device. The flat-type indicating device generally has its indicator portion covered with a protective transparent covering member, e.g., of glass, acrylic resin, or the like, which reflects the incident light at its surface and makes it difficult for the user to observe the indication, especially when he or she views it obliquely. Accordingly, to see the indication clearly, the user must tip the camera towards him or her so that his or her sight perpendicularly falls on (or strikes) the indicator plane of the indicating device. Hence, the prior art device is inconvenient with respect to seeing of the indication.

SUMMARY OF THE INVENTION

A primary object of the present invention is to provide a camera equipped with a key input-type photographic data-setting device which is easily operable yet less subject to erroneous setting of various photographic data by inadvertent key operations.

Another object of the present invention is to provide the camera of the above-mentioned type which is provided with an indicating device which facilitates visual confirmation of set photographic data.

According to the present invention, the data to be input are classified into at least first and second predetermined groups, for example, in accordance with the relevancy of the respective photographic data or the frequency of changing of the respective photographic data during photographing operations.

In an embodiment of the present invention first and second photographic data-setting sections are separately provided at different positions. The first section includes input keys manually operable for inputting the first group of photographic data and the second section includes input keys manually operable for inputting the second group of photographic data. A single indication device for indicating at least the photographic data input by the input keys of the first and second photographic data setting sections is provided on a flat oblique upper surface of the camera which descends from the front to the rear of the camera.

In another embodiment of the present invention, input keys provided at a photographic data-setting section are commonly used for inputting both of the first and second groups of photographic data. To this end, setting data-indicating means which is manually operable for movement between a first position for indication of the first group photographic data and a second position for indication of the second group photographic data is arranged adjacent to the input keys and input data changing-over means changes-over the photographic data to be input by the manual operations of the input keys in response to the movement of the setting data-indicating means between the first and second positions. This change-over enables only the input of the first group photographic data with the setting data-indicating means being at the first position and only the input of the second group photographic data with the setting data-indicating means being at the second position. Also in this embodiment, a single indication device for indicating at least the photographic data input by the input keys is provided on a flat oblique upper surface of the camera which descends from the front to the rear of the camera.

The above and other features of the present invention will become more apparent from the following description of the preferred embodiments of the present invention taken in conjunction with the accompanying drawings.

BRIEF DESCRIPTION OF THE DRAWINGS

FIGS. 1 and 2 are perspective views of a first embodiment of the present invention. FIG. 1 shows the condition with a protective cover of a photographic data-setting section being open, while FIG. 2 shows the condition with a protective cover of another photographic data-setting section being open.

FIGS. 4a, 4b and 4c are vertical sectional views of a data-setting section of a camera according to a second embodiment of the present invention, wherein FIG. 4a shows the condition with a protective cover being closed, FIG. 4b shows the condition with the protective cover being open, and FIG. 4c shows the condition with even a set data-indicating plate open.

FIGS. 5a and 5b are plane views of the photographic data-setting section of the camera according to the above-mentioned second embodiment, wherein FIG. 5a shows the condition with the protective cover being open, and FIG. 5b shows the condition with the set data-indicating plate being open.

FIGS. 9 to 12 show various modifications of the indicating device and its location, wherein

DESCRIPTION OF THE PREFERRED EMBODIMENTS

Figure 1:
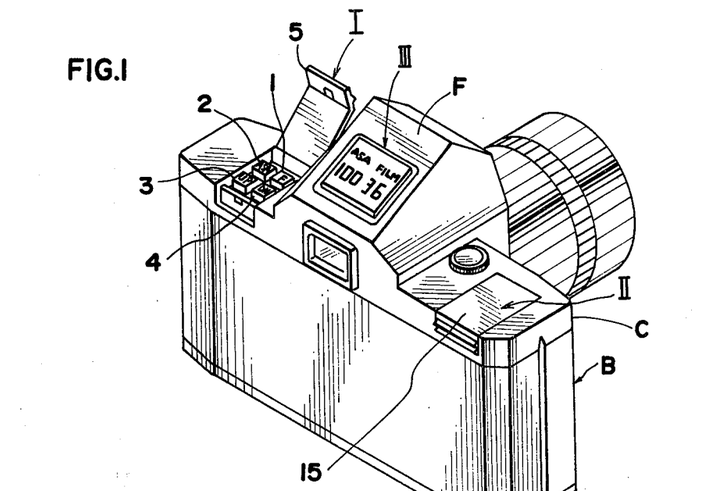
Figure 2:
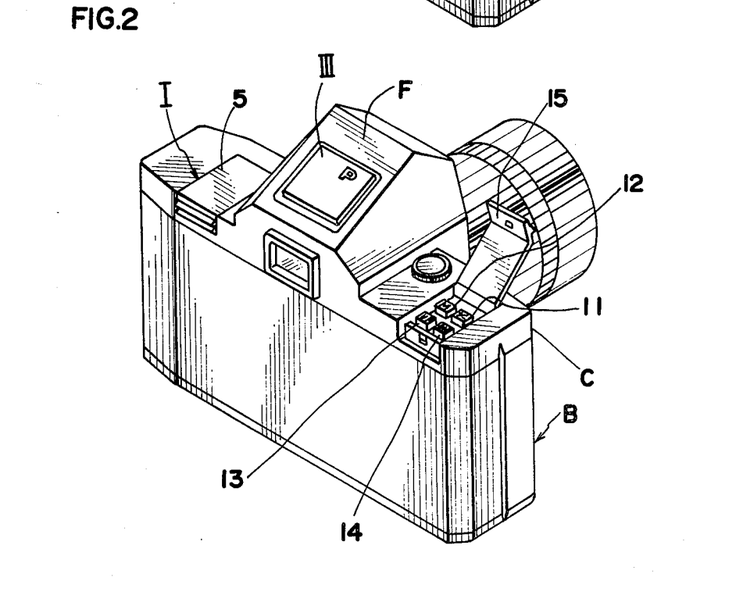

With reference to FIGS. 1 and 2, which show a camera according to a first embodiment of the present invention, on upper cover C covering the top of camera body B are provided with data-setting means including a film-related data-setting section I where data relating to the film are set, and an exposure data-setting section II where data relating to exposure parameters are set, and with indicating device III which indicates at least the photographic data set through the data-setting means. The film-related data to be set in the present embodiment includes data of film sensitivity and the number of available frames for photography, i.e., the length of film. However, the data to be set in that group are not limited to such examples but may include, as such data, the reflective index of the film, in the case of a camera of the type which measures the scene light having passed through a camera objective and reflected from the surface of the film being exposed, and further may include latitude of a film that relies on the kind of film irrespective of the type of the light-measuring system of the camera. The exposure data-setting section includes a mode selector means for alternatively selecting one of the exposure control modes, including a shutter speed priority automatic diaphragm aperture control mode (TV-P), diaphragm priority automatic shutter speed control mode (AV-P) and automatic programmed exposure control mode (P), wherein both the diaphragm and the shutter speed are controlled in a particularly programmed combination of the diaphragm aperture and shutter speed values with respect to light measurement. The exposure data-setting section also includes an exposure compensation, i.e., so-called overriding means (+/−), for manually compensating the automatically controlled exposure in consideration of the light condition of an object or scene to be photographed. The exposure-related data may further include data concerning the cooperation of the camera exposure control with an electronic flash device and/or an automatic focusing device. Such cooperative exposure controls are not included in the present embodiment but will be easily done by those skilled in the art from the teaching of the disclosed embodiment.

As shown in FIG. 1, film data-setting section I comprises frame number selection key 1 labeled as "F" and for selecting, as a parameter to be set or changed, the number of exposure frames available for the film used. Film sensitivity key 2 labeled as "ASA" and for as a parameter to be set or changed selecting the sensitivity of the film, and keys 3 and 4 labeled as "UP" and "DN", respectively, and for incrementally changing the setting of the frame number or film sensitivity selected by key 1 or 2, upwards (additively) or downwards (subtractively). Film data-inputting section I is arranged to be covered by protecting cover 5 for the protection from inadvertent access thereto. Cover 5 is hinged to be rotated in the transverse direction of camera body B.

Exposure data setting II comprises exposure compensation key 11 labeled as "+/−" and for selecting, as a parameter to be set or changed, the amount of the exposure compensation, exposure mode selection key 12, and keys 13 and 14 labeled as "UP" and "DN", respectively, and for incrementally changing the setting of the exposure compensation or the exposure mode selected by key 11 or 12, upwards, i.e., additively, or downwards, i.e., subtractively. Exposure data-setting section II is also arranged to be covered by rotatable protective cover 15 for the protection from inadvertent access thereto similarly to the film data-inputting section.

The camera shown in FIGS. 1 and 2 is a single lens reflex camera with a pentagonal roof prism. Upper or top cover C of the camera is formed with a protruding portion to cover the pentagonal roof prism. The protruding portion is formed with the flat oblique plane F descending from the front to the rear of the camera body. Oblique plane F is generally in parallel with the roof edge of the pentagonal roof prism located below the plane and its imaginary extension meets the plane of the front and back surfaces of the camera body to make horizontal lines. Indicating device III is located on the oblique plane and is composed of a flat-type indicating means comprising a liquid crystal cell or light-emitting diodes.

Figure 3:
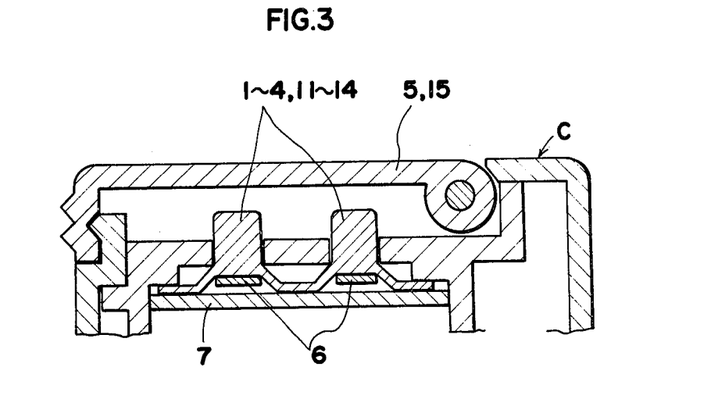
FIG. 3 is vertical sectional view of the photographic data-setting section of the camera according to the above-mentioned first embodiment.

FIG. 3 shows a cross-section of the structure for the input keys of the data-setting section in the first embodiment of the present invention. Both film data-setting section I and exposure data setting section II shown in FIGS. 1 and 2 have the same structures with each other. Under keys 1 through 4 or 11 through 14, electrically-conductive rubber strips 6 are disposed oppositely to their corresponding contacts in the printed circuit pattern on circuit plate 7.

Figure 4A:
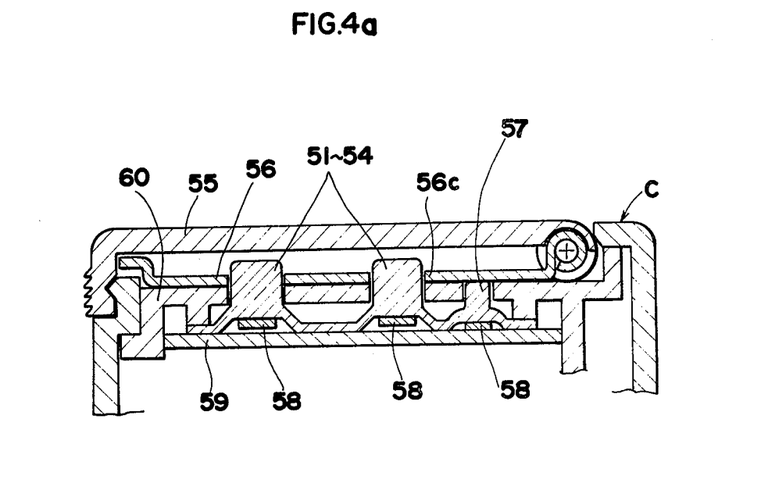

FIGS. 4(a), 4(b), 4(c), 5(a) and 5(b) show the cross-sections of the camera data setting means according to a second embodiment of the present invention. In the embodiment, the photographic data are classified into frequently changed data, such as the shutter speed and diaphragm aperture values, and infrequently changed data, such as the film-related data which are set only upon film loading, and the data-setting section is arranged to be differently operated for data setting in accordance with the frequency of the data changing. Although two sets of input keys are provided for the classified two kinds of data in the above first embodiment, the present embodiment is arranged such that a single set of keys are used for the input of two kinds of data by changing over therebetween by a switch. As shown in FIG. 4a, setting data-indicating plate 56 is disposed under protective cover 55 and input keys 51 through 54 extend through and protrude above setting data-indicating plate 56 so that those keys are accessible not only when only protective cover 55 has been opened but also when the setting between data input indicating plate further has been opened. Under setting data indicating plate 56 is disposed change-over switch member 57, of which contacts are opened or closed in conjunction with the opening of setting data input indicating plate to select the data of either class.

Figure 4B:
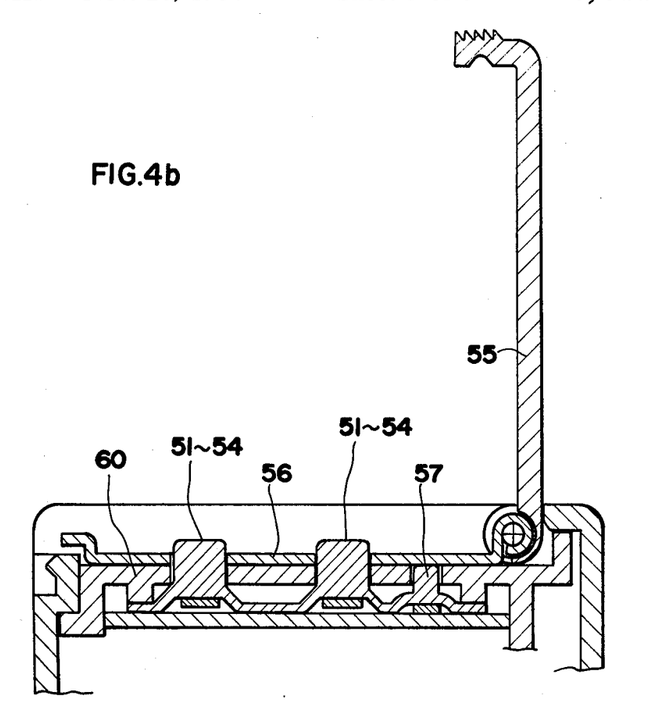
Figure 4C:
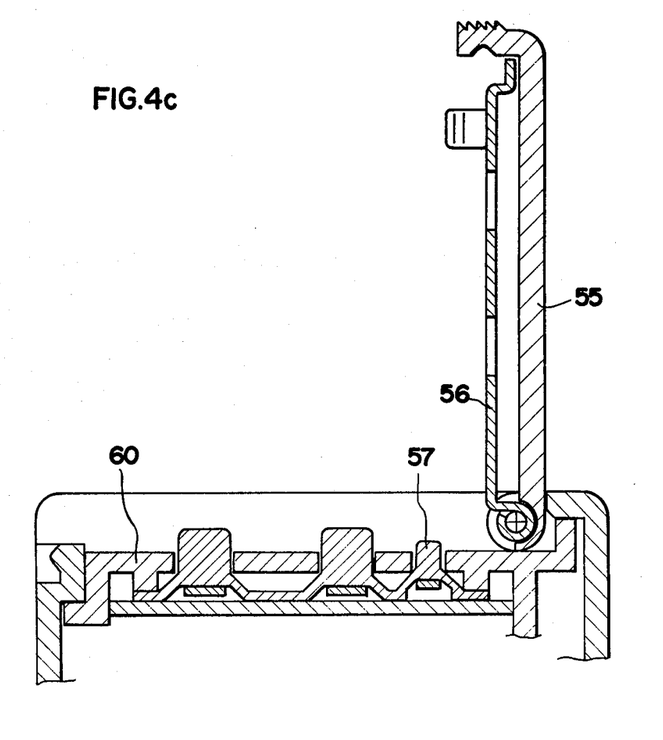
Figure 5A:
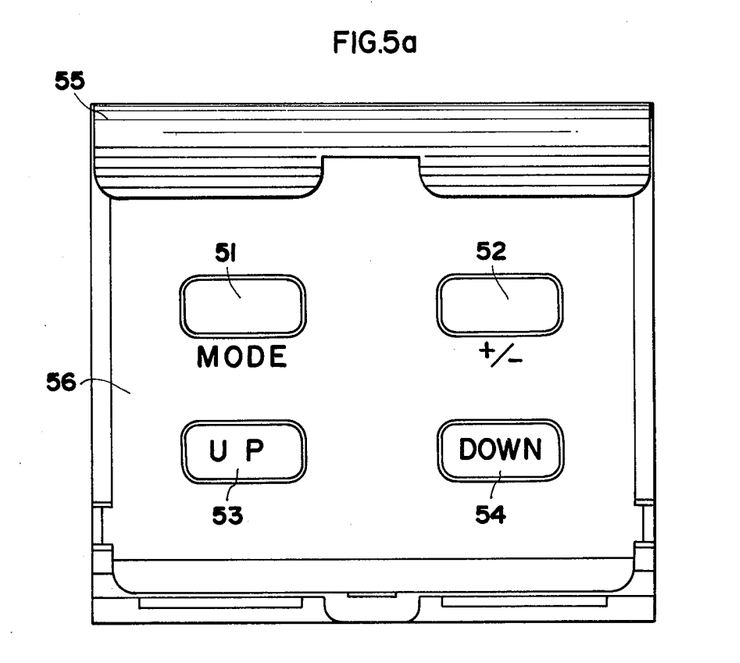
Figure 5B:
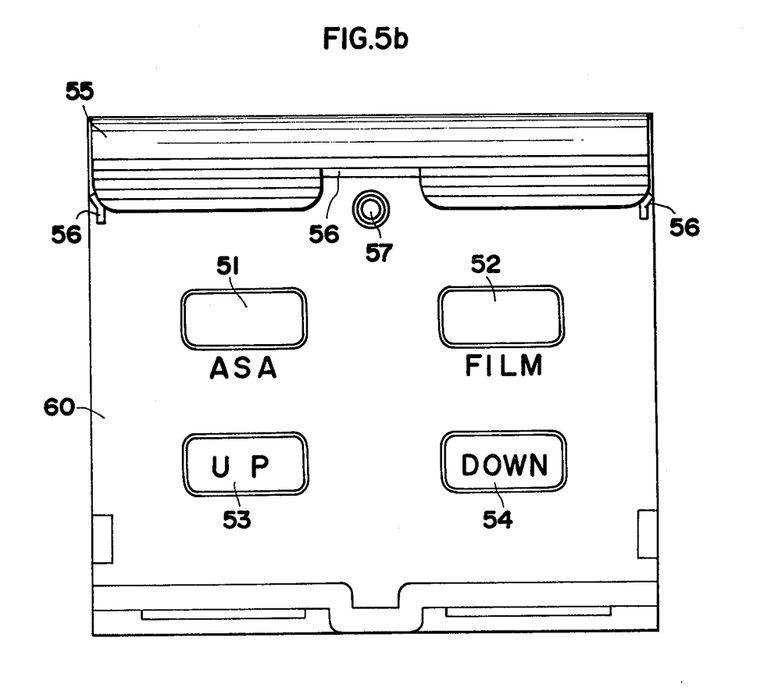

Of the Figures, FIGS. 4b and 5a respectively show cross sectional and plane views of the data-setting section with only protective cover 55 being open. FIGS. 4c and 5b respectively show cross section and plane views of the data-setting section with both protective cover 55 and setting data-indicating plate 56 being open. When only protective cover 55 is open can exposure data be input. To this end, a mark "MODE" for indicating the exposure mode selection and a mark "+/−" for indicating the setting of the exposure compensation rate are printed on the front surface of data setting-indicating plate 56 and located adjacent to corresponding input keys 51 and 52. When both protective cover 55 and setting data-indicating plate 56 are open, film data can be set. Mark "ASA" for indicating the film sensitivity setting and mark "FILM" for indicating the film frame number setting are printed on the front surface of the key holder member 60 under data setting-indicating plate 56, and located adjacent to their corresponding keys 51 and 52. Marks "UP" and "DOWN" are printed on the surfaces of UP key 53 and DOWN key 54 as in the case of FIG. 3.

Figure 6:
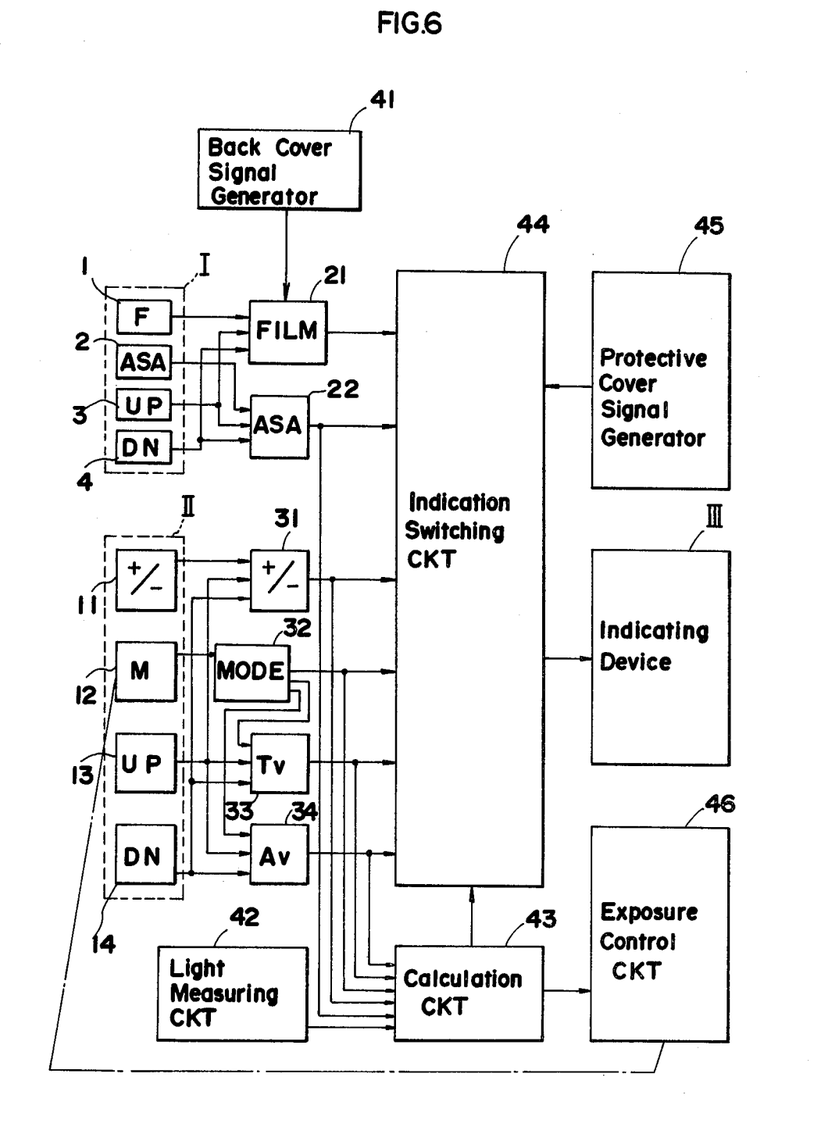
FIG. 6 is a block diagram of the circuit of the camera according to the above-mentioned first embodiment.

With reference to FIG. 6, which is a block diagram showing the circuit construction of the camera adapted for the first embodiment, film data-setting section I includes the above-mentioned keys 1 through 4 and is associated with frame counter 21 for film frame number setting and sensitivity counter 22 for film sensitivity setting. In the frame counter 21, a value "24" is initially set by a back cover closure signal supplied from the back cover signal generator 41 which generates signals upon opening and closing of the camera back cover. The initially set value is increased or decreased by one in response to the signal provided by the input key 3 or 4 when the film frame number setting is designated by the operation of key 1. The value increased or decreased in frame counter 21 is reset by a back cover opening signal. In sensitivity counter 22, a generally used film sensitivity value of 100 is initially set and is increased or decreased by $\frac{1}{3}$ EV (in the meaning of APEX exposure calculation system) by a signal supplied from input key 3 or 4 when the film sensitivity setting is designed by the operation of input key 2. The exposure data-setting section II includes the above-mentioned input keys 11 through 14 and is associated with an override counter 31 for exposure compensation, exposure mode counter 32 for the selection of the exposure control mode, shutter speed counter 33 for the setting of the shutter speed value and diaphragm counter 34 for the setting of the diaphragm aperture value. In the override counter 31, a value "0" is initially set and the initial value is increased or decreased by 0.5 EV by the APEX unit in response to the signal supplied from input keys 13 or 14 when the exposure compensation is designated by input key 11. Exposure mode counter 32 comprises a ring-counter which selectively and cyclically generates three signals respectively representative of three exposure control modes, i.e., program mode (referred to as P mode hereinafter), shutter speed priority automatic diaphragm control mode (referred to as TV-P mode) and diaphragm aperture priority automatic shutter speed control mode (referred to as AV-P mode). In exposure mode counter 32, the P mode is initially set and the selected mode is changed consecutively among the three when input key 12 is depressed. The shutter speed counter 33 is initially set to a frequently used shutter speed, for example, 1/125 second. The set value is changed by 1 EV in response to the signal supplied from the input key 13 or 14 when TV-P mode is designated by the operation of input key 12. Diaphragm counter 34 is initially set to a diaphragm value, for example, F5.6. The set value is changed by 1 EV in response to the signal supplied from input key 13 or 14 when AV-P mode is designated by the operation of input key 12.

Light-measuring circuit 42 converts an analog light measurement signal to a digital signal, which is applied to calculation or operation circuit 43. Calculation circuit 43 is applied, to its input terminals, with the set data outputs of counters 22, 31, 32, 33 and 34 the light measurement output of light-measuring circuit 42, and generates exposure data signals which represent a shutter speed value and a diaphragm aperture value calculated for the selected exposure mode and which are supplied to the indication-switching circuit 44 and exposure control circuit 46. The indication-switching circuit 44 is applied with set data signal from counters 21, 22, 31, 32, 33 and 34 and exposure data signals from the calculation circuit 43, and switches and selects photographic data in accordance with the designation by the operation of input keys 1, 2, 11 and 12. The protection cover signal circuit 45 applies indication switching signals to indication-switching circuit 44 in response to the opening and closing of protective covers 5, 15 and 55 to control indication switching circuit 44 such that exposure data are selected with the protective covers closed and set data are selected with the protective covers open. Although not shown in the Figures, switches opened and closed in association with the opening and closing of protective covers 5, 15 and 55 are provided to cause circuit 45 to generate the indication-switching signals. Indicating device III is composed of a decoder for indication, a driver circuit and visible indicator elements such as liquid crystal cells, light-emitting diodes or the like, and indicates values of the exposure data selected by the indication switching circuit 44. Exposure control circuit 46 controls camera exposure in accordance with exposure data from calculation circuit 43, in the selected exposure control mode, by controlling camera shutter and diaphragm by means of well-known electromagnetic means or the like.

FIGS. 7(a) to 7(e) are schematic illustrations showing the indications by indicating device III. The operation of the above-described embodiments will now be explained in detail with reference to the indications shown in the Figures. In the embodiment shown in FIGS. 1 and 2, input keys of film data setting section I will appear when protective cover 5 is opened. In conjunction with the opening of protective cover 5, protection cover signal generator 45 generates an indication switching signal and indicating device III displays mark "FILM" for indicating the film frame setting and mark "ASA" for indicating the film sensitivity setting. At the same time, indicating device III displays the numeral "24" below the mark "FILM" and the numeral "100" below the mark "ASA" for indicating initially set film frame and film sensitivity values. If frame number selection key 1 is depressed to select the film frame number setting and then UP key 3 labeled as "UP" is depressed, the indication of the film frame number changes to "36". Otherwise, if DOWN key 4 labeled as DN is depressed, the indication of the film frame number will decrease to "20" and further to "12". The film frame number setting will be accomplished by releasing UP key 3 or DOWN key 4 when a number commensurate with the frame number of the film loaded in the camera is displayed. Then, if sensitivity setting key 2 is depressed, the data of the film frame number of the value being displayed is held in counter 21 and the film sensitivity setting mode is selected to enable the setting of the film sensitivity value. The indicated number of the film sensitivity can be changed by the depression of UP key 3 or DOWN key 4 as in the case of the film frame number setting. The film sensitivity value can be set by releasing UP key 3 or DOWN key 4 when the number commensurate with the sensitivity value of the film being used is displayed. If protective cover 5 is closed after the accomplishment of these settings, the data of the set film sensitivity value, which was displayed last, is held in counter 22. When protective cover 5 is opened, the values of the film sensitivity and the film frame number are always preferentially displayed on indicating device III. (See FIG. 7a). In response to the closing operation of protective cover 5, indication-switching circuit 44 receiving an indication switching signal from protection cover signal generator 45 automatically changes the indication of indicating device III from the indication of the film related data to the indication of exposure data.

Figure 7A:
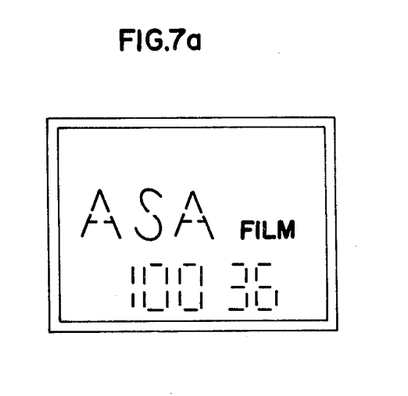
FIGS. 7a through 7e are schematic plane views showing exemplary indications by the indicating device of the camera according to the above-mentioned first embodiment.
Figure 7B:
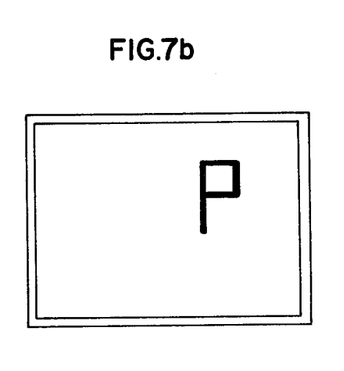
Figure 7C:
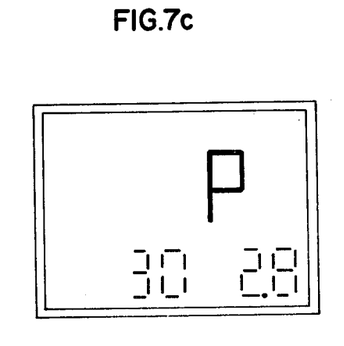
Figure 7D:
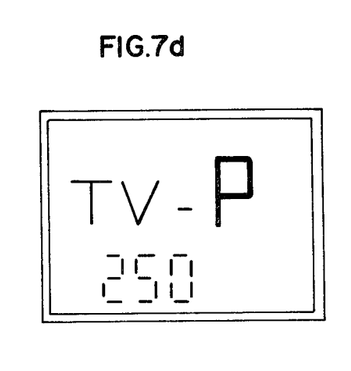
Figure 7E:
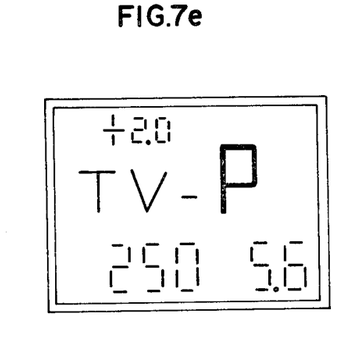

When protective cover 5 is closed, the exposure data including the shutter speed and the diaphragm aperture values are automatically set to initial values with the program exposure control mode being selected. If protective cover 15 for exposure data II is open at the time indication switching circuit 44 receiving an indication switching signal from protection cover signal generator 45 causes indicating device III to indicate the set or selected exposure mode, i.e., only the mark "P" for the indication of program exposure control mode which has been automatically initially set as described above with no exposure data setting operation being made (see FIG. 7b). If the user wishes to take photographs without changing exposure control mode from the initially set program mode, he or she may close protective cover 15 without operating keys 11 through 14 of the exposure data setting section II. Then, as shown in FIG. 7c, indicating device III indicates a shutter speed and a diaphragm aperture value calculated from a measured object brightness, for the program exposure control. If the exposure control mode is desired to be changed, protective cover 15 should be opened to enable access to exposure data-setting section and photography mode selection key 12 should be operated. While key 12 is being depressed, the indication of indicating device III changes among P mode, shutter speed priority (TV-P) mode and diaphragm aperture priority (AV-P) mode from one to another cyclically. When the shutter speed priority mode is selected, indicating device III indicates an initially set shutter speed value, e.g., 1/125 second (displayed as "125") with the indication of the selected exposure control mode. When the diaphragm aperture control mode is selected, indicating device III indicates an initially set diaphragm aperture value, e.g., F5.6 (displayed as 5.6) with the indication of the selected exposure control mode. When a desired exposure mode is indicated, key 12 should be released. If the user wishes to change the value of the exposure parameter to be preferentially set, from the automatically initially set value, a desired preferential exposure parameter value can be set by depressing UP key 13 or DOWN key 14. In the case shown in FIG. 7d, for example, shutter speed priority (TV-P) mode is selected and the set shutter speed is 1/250 second. While protective cover 15 is open, only the set value is indicated. Accordingly, only the value of the preferentially set exposure parameter is visually indicated along with the selected exposure control mode. This is convenient because the possibility of wrongly setting the exposure parameter value is less. When protective cover 15 is closed, indicating switching circuit 44 receiving indication-switching signal from protection cover signal generator 45 causes indicating device III to indicate the preferentially set exposure parameter value and an exposure parameter value which has been calculated from a set film sensitivity value and a measured object brightness and which used for the automatic control of another exposure parameter. FIG. 7e shows such a case. In the case of FIG. 7e, the exposure compensation rate is set to +2.0 EV. When protective cover 15 is opened and override key 11 is depressed, an initial value "0.0" is displayed. If input key 13 or 14 is operated in accordance with a desired amount or rate of the exposure compensation, an amount of exposure compensation, such as +0.5 ----, +2.0 or −0.5,----, −20 can be set. The set amount of exposure compensation will be cancelled, i.e., restored to the initial neutral value by re-operating input key 11. Although no exemplary circuit arrangement of indication switching circuit 44 is shown, it will be easily designed by those skilled in the art in consideration of the above-mentioned functions thereof.

As described above, the photographic data setting device will be easily operable with less possibility of wrong operations and will be convenient in operation by classifying the photographic data, for example, into film related data and exposure data, in accordance with the type or relevancy of the respective data.

It should be noted that although in the above description counter 21 is constructed to count and store only the set data from film data setting section I and indicating device III indicates only the set film frame number, device 41 may be constructed to generate not only the back cover opening/closing signal but also pulse signals in response to each wind-up of a film by one frame length through a film count mechanism known per se and counter 21 may be constructed to make substruction from a set value in response to the pulse signals thereby enabling indicating device III to indicate the number of remaining film frames available for photography.

In the case of the second embodiment wherein a single group of input keys are commonly used for the setting of a plurality of kinds of data, the protective cover opening/closing signal generator circuit may be constructed such that a signal is further generated in response to the opening and closing of setting data indicating plate 56 and the transmission of the signal from the single group of keys is switched between counters 21 and 22 and counter 31 to 34 in response to the signal due to the opening or closing of plate 56. In this case, the operation of the photographic data setting device is substantially the same as that of the above first embodiment and is not explained in detail here. In short, when protective cover 55 is open, exposure data that are frequently changed, can be set, whereas only when setting data indicating plate 56 is further open, the film related data that are rarely changed, can be set.

Thus, the setting of photographic data can be made by classifying the data in accordance with the sort or relevancy of the respective photographic data as in the case of the first embodiment and in accordance with the frequency of data changing in the photographing operation as in the case of the second embodiment. However, the present invention is not limited to such a manner. The classification may be determined depending on the camera type, the level of the expected camera users, i.e., whether he or she is a beginner or expert. It should be noted that the manner of classifying the photographic data in the first embodiment is also applicable to the second embodiment and that the manner of classifying the photographic data in the second embodiment is also applicable to the first embodiment.

Figure 8:
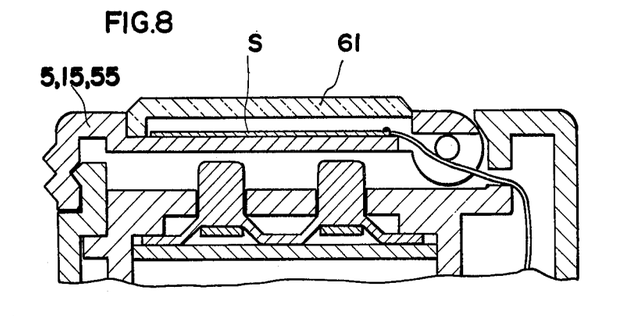
FIG. 8 is a vertical sectional view of a photographic data-setting section of the camera according to the third embodiment of the present invention.

FIG. 8 is a cross sectional view showing an exemplary application of the present invention to a photographic data setting device. In the device, a solar battery S is provided on the surface of a protective cover 5, 51 or 55 to make effective use of the protective cover. Solar battery S is used as a power source for charging a small battery such as a nickel-cadmium cell, silver-oxide cell, or the like used as a power source for the camera. In this case portion 61 of protective cover 5, 15 or 55 that covers solar battery S is made of a transparent cap of a material such as an acrylic resin material. Additionally, the location of the plurality of groups of input keys is not limited to the plane location as in the first embodiment, but they may be located three-dimensionally in the vertical direction.

Figure 9:
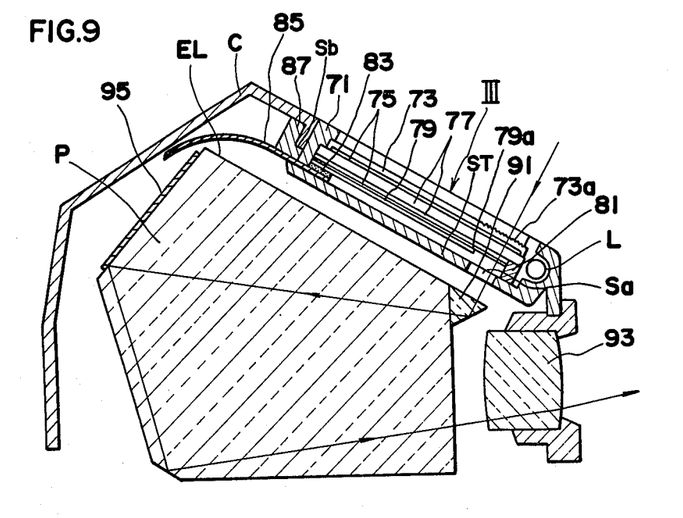
FIG. 9 is a vertical sectional view of the first modification.

The variation shown in FIG. 9 is concerned with the structure of indicating device III. In this case, indicating device III comprises a liquid crystal cell arranged to provide not only a reflective type indicating system which can be observed from the exterior of the camera and but also a transmissive type indicating system which can be observed in the camera viewfinder field. In the Figure, indicating device III is disposed on a plane that is generally parallel to roof edge EL running downward from the apex P of the pentagonal roof prism to eye piece 93. Indicating device III is, as a whole, supported by a well-known mounting manner such as fastening by screws, resiliently held by leaf springs or the like on support SP which in turn is integrally provided on the camera top cover C serving also as a cover for the pentagonal roof prism. As is well-known as a structure of liquid crystal cell, indicating device III is composed of outer frame 71, protective window panel 77 of glass, acrylic resin or other transparent material, a pair of glass plate 77 for retaining the liquid crystal material therebetween, a pair of polar or polarizing screen plates 75 disposed on each outer surface of glass plate 77, and reflective plate 79 disposed at the rear side of the body of the liquid crystal material. The liquid crystal-indicating device comprises two indicating portions which are arranged on the same plane and which display the same photographic data, with reflective plate 79 terminating at edge 79a to match one of the two portions. With this structure, the portion where reflective plate 79 provides a reflective-type display while the portion where there is no reflective plate provides a transmissive-type display. At the portion of window panel 73 that aligns with the transmissive-type display portion, light scattering portion 73a is provided for lighting. Light scattering portion 73a has a finely rugged structure and protects the transmissive type liquid crystal display portion from the light directly impinging on there. The image displayed by the transmissive-type liquid crystal display portion is introduced through opening Sa of support ST and sub-prism 91 cemented to a portion of the pentagonal roof prism P, into the latter where the light bearing the image is reflected a plurality of times as shown and directed to the users eye through eye piece 93. The numeral 95 denotes a prism holder for holding the pentagonal roof prism.

The display of the reflective-type liquid crystal display portion of indicating device III can be observed from the exterior of the camera through window panel 73 as is known in the art. Between indicating device III and support ST is provided spacer 81, electrically-conductive rubber member 83 and flexible printing board 85. The circuit on flexible printing board 85 is connected to a driver circuit (not shown) through opening Sb of support ST. Light-blocking member 87 extending in the above-mentioned opening Sb is provided for blocking stray light which enter the pentagonal prism chamber from the exterior of the camera. At the side of indicating device III is provided an illuminating light source L for illuminating the liquid crystal display when ambient light is low. The light source is energized by the operation of a power switch (not shown) to enable observation of the display within and from the exterior of the camera even when the camera surroundings are dark. As indicating device III is directly fixed on top cover C, the above construction is effective for the fixation of the device to top cover C.

Figure 10:
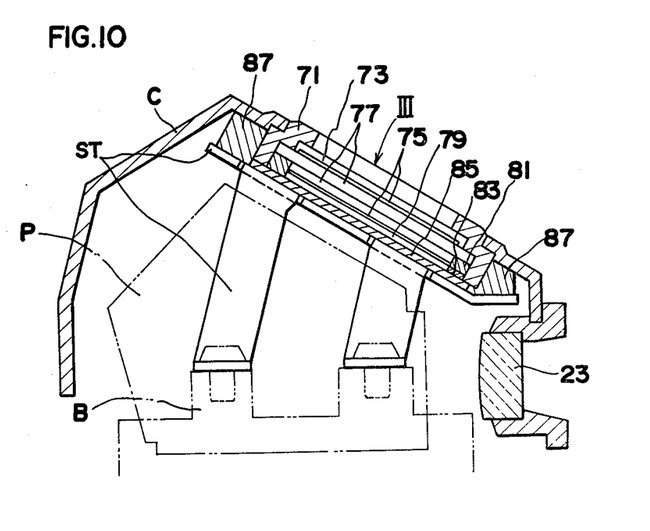
FIG. 10 is a vertical sectional view of the second modification.

The manner of fixing the indicating device to the camera is not limited to that wherein the device is directly fixed to the top cover as shown in FIG. 9. The indicating device may be modified to be fixed on the camera body B by support member ST under the top cover C. FIG. 10 is a cross sectional view of the main portion of such a modification, showing the structure concerned with the indicating device. It should be understood that indicating device III is shown as a liquid crystal display of an entirely reflective type. The structure of the device is substantially the same as that shown in FIG. 9 but in the form without the transmissive-type display portion, and explanation thereof is not made here. This structure is advantageous in the circuit connecting and assembling operation upon manufacturing, since top cover C can be attached after indicating device III has been attached entirely to camera body B and its electrical connection to a driver circuit has been completed.

In the above embodiments and their modification, the space above the pentagonal roof prism was effectively utilized for the oblique plane where the indicating device is located. However, the arrangement of the oblique plane is not limited to such a location. The oblique plane may be formed by protruding the photographic data input device which is adapted for key inputting various photographic data such as, the film sensitivity, the shutter speed, the diaphragm aperture value, the exposure control mode, etc. Such variations will now be explained with reference to FIGS. 11 and 12.

Figure 11:
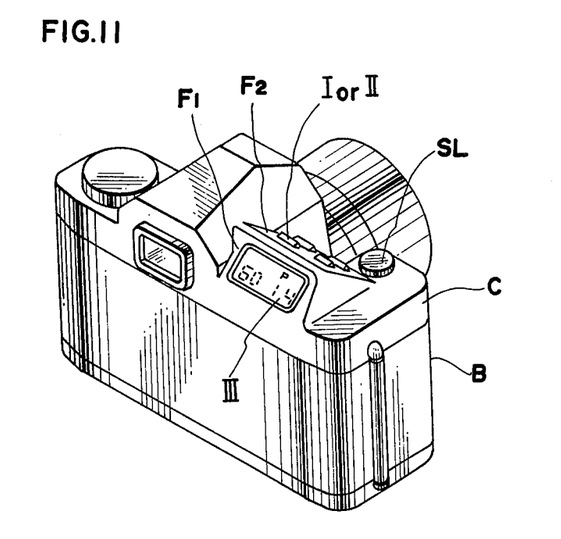
FIG. 11 is a general perspective view of the camera employing the third modification.

The camera shown in FIG. 11 is a single lens reflex camera with a built-in motor driven film wind-up device and accordingly the film wind-up lever is removed. A protruding portion is formed at the right hand side (as viewed in the Figure) of the pentagonal prism on top cover C which covers the upper portion of camera body B. The protruding portion is located in the vicinity of shutter release button SL and is formed with first oblique plane $F_1$ slanting downward from the center of camera body B with respect to the direction from its front to the its rear and second oblique plane $F_2$ slanting downwardly from the center towards the camera front. Indicating device III is located on first oblique plane $F_1$ and photographic data-setting section I or II is located on the second oblique plane. The slanting angle of first oblique plane $F_1$ is selected to such a value as to facilitate the observation of indicating device by the user in the slanting direction from upper rear portion. The angle of the second oblique plane $F_2$ is selected to such a value as to enable the user to operate the input keys with a finger for operating the shutter release button, e.g., the forefinger while he or she holds the camera.

Figure 12:
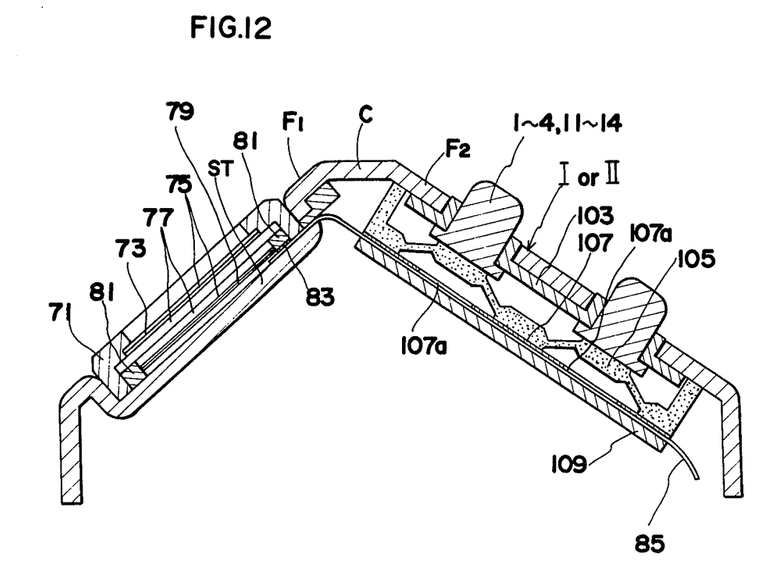
FIG. 12 is a vertical sectional view of the third modification.

With reference to FIG. 12, indicating device III is a reflective-type liquid crystal-indicating device with a structure same as that shown in FIG. 10, and it seems unnecessary to explain here again. It is seen that the liquid crystal-indicating device is directly fixed on top of cover C likely as in the structure of FIG. 9. Depression keys 1~4, 11~4 of photographic data-setting section I or II are supported by key supporting means 103 provided along oblique plane $F_2$. Electrically-conductive rubber 105 is disposed under depression keys, and is biased to project depression keys to the camera exterior by the elasticity of the rubber itself. Insulation sheet 107 is provided between conductive rubber 105 and flexible printed board 85 as is formed with openings in registration with the depression buttons 1~4, 1~14. A pair of contact terminals are provided on printed board 85 at the position to be registered with each opening. With such construction, when depression buttons 1~4, 11~14 are depressed to bring conductive rubber 105 into contact with flexible printed board 85, the pair of contacts are short-circuited and the short-circuited signal is applied as an input signal to corresponding counters 21 22 31 33 34. The members from depression buttons 1~4, 11~14 to flexible printed board 85 are supported by the printed board supporting board 109 as a supporting means. Supporting board 109 may be fixed either to camera body B or top cover C.

The above-described location of indicating device III is applicable not only to the single lens reflex camera with a pentagonal roof prism and a built-in motor driven wind-up device as shown in FIG. 11, but also to other various types of cameras, for example, a camera provided with a manual film wind-up mechanism with a film wind-up lever and/or with a viewfinder system with a double image-coinciding type range finder. The oblique plane may be located at any desired position such as in the vicinity of the film wind-up lever.

The provision of a protruding portion on top cover C covering the upper portion of camera body results in an increase of the surface area of the camera upper portion, enabling location of not only input keys but also an indicating device, although only input keys can be located on the conventional camera. When indicating device III and photographic data setting section I or II is disposed at the front and rear on the opposite side of the central line of the camera body as shown in FIG. 11, the photographic data input by means of the keys can be easily confirmed by the indicating device located in a close vicinity of photographic data-setting section I or II. Additionally, the setting of the photographic data with the same finger for operating shutter release button enables the setting of the camera being held normally, and dispenses the change of holding of the camera as required in conventional cameras, thereby providing high operability.

What is claimed is:

1. A camera in which a plurality of photographic data are input by manual key operations, comprising:
   a photographic data-setting section provided at a position of said camera for setting said photographic data;
   manually operable input keys provided at said photographic data-setting section;
   setting data-indicating means arranged adjacent to said input keys and manually operable for movement between a first position for indication of a first predetermined group of said photographic data and a second position for indication of a second predetermined group of said photographic data; and
   input data changing-over means responsive to the movement of said setting data-indicating means between said first and second positions for changing-over the photographic data to be input by the manual operations of said input keys so that only the first group photographic data can be input with said setting data-indicating means being at said first position and so that only the second group photographic data can be input with said setting data-indicating means being at said second position.

2. A camera as defined in claim 1, wherein said setting data indicating means includes an indication plate member through which said input keys project and which is supported for rotation between an opened position corresponding to said first position of said setting data-indicating means and a closed position corresponding to said second position of said setting data-indicating means, said indication plate member having at positions adjacent to said input keys indication symbols indicating the first group photographic data.

3. A camera as defined in claim 2, further comprising a base plate member through which said input keys project and which has, adjacent to said input keys, indication symbols indicating the second group photographic data, wherein said indication plate member covers said base plate member in said closed position while uncovers said base plate member in said opened position.

4. A camera as defined in claim 3, wherein said input data changing-over means includes a switch switched between two states in response to the rotation of said indication plate member between said opened and closed positions for the change-over of the photographic data to be input by the manual operations of said input keys.

5. A camera as defined in claim 4, further comprising a protective cover manually operable for movement between a closed position covering said input keys and said indication plate member and an opened position for uncovering said input keys and said indication plate member.

6. A camera as defined in claim 5, wherein said protective cover is made of a transparent material and incorporates a solar battery.

7. A camera as defined in claim 1, wherein said photographic data are classified into said first and second predetermined groups in accordance with the frequency of changing of said respective photographic data during photographic operation.

8. A camera as defined in claim 7, wherein said first predetermined group includes photographic data which are more frequently changed upon photographing operation than those included in said second predetermined group.

9. A camera as defined in claim 1, wherein said photographic data are classified into said first and second predetermined groups in accordance with the relevancy of said respective photographic data.

10. A camera as defined in claim 1, wherein said input keys are classified into a first group for designation of the photographic data to be input and a second group for inputting the photographic data designated by said first group input keys.

11. A camera as defined in claim 1 further comprising an indication device for indicating at least the photographic data input by the manual operations of said input keys.

12. A camera as defined in claim 11, wherein said indication device is of a flat type and located at a flat oblique upper surface of said camera which descends from the front to the rear of said camera and whose imaginary extension meets the front and back surfaces of said camera to make horizontal lines.

13. A camera as defined in claim 12, wherein said camera is a single lens reflex camera including a pentagonal roof prism and a prism cover therefor, said prism cover having a flat surface parallel to the roof edge of said pentagonal roof prism as said flat oblique upper surface.

14. A camera as defined in claim 13, further comprising a support member for supporting said indication device on said prism cover.

15. A camera as defined in claim 13, further comprising a camera body and a support member for supporting said indication device on said camera body.

16. A camera comprising:
a photographic data setting device;
a camera body;
a top cover for said camera body and having a first flat oblique surface descending from the front to the rear of said camera body; and
a flat type indication device located on said first flat oblique surface for indication of at least the photographic data set by said photographic setting device.

17. A camera as defined in claim 16, wherein said camera is a single lens reflex camera including a pentagonal roof prism and a prism cover therefor, said prism cover having a flat surface parallel to the roof edge of said pentagonal roof prism as said first flat oblique surface.

18. A camera as defined in claim 17, further comprising a support member for supporting said indication device on said prism cover.

19. A camera as defined in claim 17, further comprising a support member for supporting said indication device on said camera body.

20. A camera as defined in claim 16, further comprising a second flat oblique surface located in front of said first flat oblique surface and descending from the rear to the front of said camera body, said photographic data-setting device being provided on said second flat oblique surface.

21. A camera as defined in claim 20, furtner comprising a manually operable shutter release button provided on said top cover, said first flat oblique surface is located adjacent to said shutter release button.

22. A camera in which a plurality of photographic data are input by manual key operations, comprising:
a film-related data-setting section for setting data relating to a film used; and
an exposure data-setting section for setting data relating to exposure parameters other than film sensitivity and/or exposure modes achievable by said camera,
wherein said film-related data-setting section and said exposure data-setting section are provided separately at different positions of said camera, and each of said sections includes input keys manually operable for inputting the corresponding photographic data, located adjacent to one another.

23. A camera as defined in claim 22, wherein said input keys of said film-related data-setting section includes a film sensitivity-setting designation key for designating setting of the data relating to the film sensitivity of the film used, a film frame number-setting designation key for designating setting of the data relating to the number of available frames of the film used, and up and down-keys for incrementally changing the data, the setting of which is designated by either one of said setting designation keys, upwards and downwards, respectively.

24. A camera as defined in claim 22, wherein said first and second photographic data-setting sections are spaced from one another on co-planar flat upper surfaces of said camera.

25. A camera as defined in claim 22 or 23, wherein said input keys of said exposure data-setting section includes an exposure mode-setting designation key for designating setting of the data relating to the exposure modes achievable by said camera, an exposure compensation-setting designation key for designating setting of the data relating to the amount of exposure compensation, and up and down-keys for incrementally changing the data, setting of which is designated by either one of said exposure mode-setting designation key and said exposure compensation-setting designation key, upward and downward, respectively.

26. A camera in which a plurality of photographic data are input by manual key operations, comprising:
a first photographic data-setting section for setting a predetermined first group of said photographic data;
a second photographic data-setting section for setting a predetermined second group of said photographic data, said first and second photographic data-setting sections being provided separately at different positions of said camera and each of said first and second photographic data-setting sections including input keys manually operable for inputting the corresponding photographic data; and
first and second protective covers for covering said input keys of said first photographic data-setting section and those of said second photographic data-setting section, respectively, each of said first and second protective covers being adapted to be opened and closed manually.

27. A camera as defined in claim 26, further comprising a protection cover signal generator for generating indication-switching signals in response to the opening and closing of said respective first and second protective covers and an indication switching circuit for controlling said indication device in accordance with said indication-switching signals such that said indication device indicates the first group photographic data with said first and second protective covers opened and closed, respectively, and the second group photographic data with said first and second protective covers closed and opened, respectively.

28. A camera as defined in claim 26, wherein said first and/or second protective covers are made of a transparent material and incorporate a solar battery.

29. A camera in which a plurality of photographic data are input by manual key operations, comprising:
a first photographic data-setting section for setting a predetermined first group of said photographic data;
a second photographic data-setting section for setting a predetermined second group of said photographic data, said first and second photographic data-setting sections being provided separately at